(12) United States Patent
Taylor

(10) Patent No.: US 9,407,910 B1
(45) Date of Patent: Aug. 2, 2016

(54) FAST INTEGER AND DIRECTIONAL TRANSFORMS FOR DATA ENCODING

(71) Applicant: OTOY, INC., Sherman Oaks, CA (US)

(72) Inventor: Malcolm Ian Taylor, Palmerston North (NZ)

(73) Assignee: Otoy, Inc., Sherman Oaks, CA (US)

( * ) Notice: Subject to any disclaimer, the term of this patent is extended or adjusted under 35 U.S.C. 154(b) by 284 days.

(21) Appl. No.: 13/965,790

(22) Filed: Aug. 13, 2013

Related U.S. Application Data

(62) Division of application No. 12/709,343, filed on Feb. 19, 2010, now Pat. No. 8,537,899.

(51) Int. Cl.
*H04N 7/12* (2006.01)
*H04N 19/625* (2014.01)

(52) U.S. Cl.
CPC .............................. *H04N 19/00812* (2013.01)

(58) Field of Classification Search
CPC .................................................. H04N 19/00812
USPC ........................................................ 375/240.2
See application file for complete search history.

(56) References Cited

U.S. PATENT DOCUMENTS

| | | | | |
|---|---|---|---|---|
| 2009/0238481 A1* | 9/2009 | Huang et al. | ................... | 382/238 |
| 2009/0238484 A1* | 9/2009 | Xu et al. | ....................... | 382/250 |

* cited by examiner

*Primary Examiner* — Richard Torrente
(74) *Attorney, Agent, or Firm* — James J. DeCarlo; Greenberg Traurig LLP

(57) ABSTRACT

Methods, apparatuses and systems directed to frequency domain transforms, including fast integer transforms and directional integer transforms. Further disclosed is a video codec that utilizes a novel class of fast integer and directional transforms.

8 Claims, 7 Drawing Sheets

$Pred_{DC}(X) = a_{DC} + b_{DC} - c_{DC}$

FREQUENCY RESPONSE OF DCT FOR N = 3

FREQUENCY RESPONSE OF FIT FOR N = 3

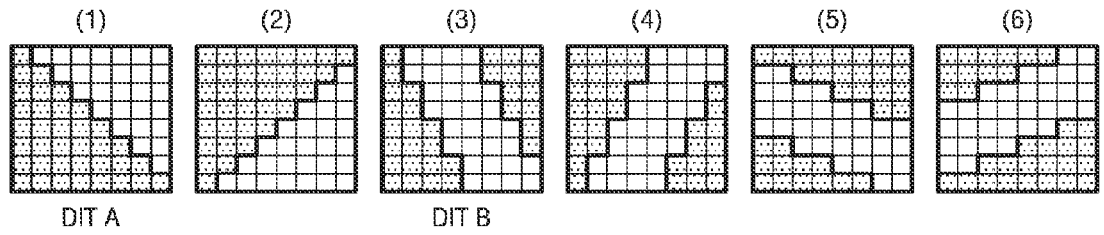
FIG. 8
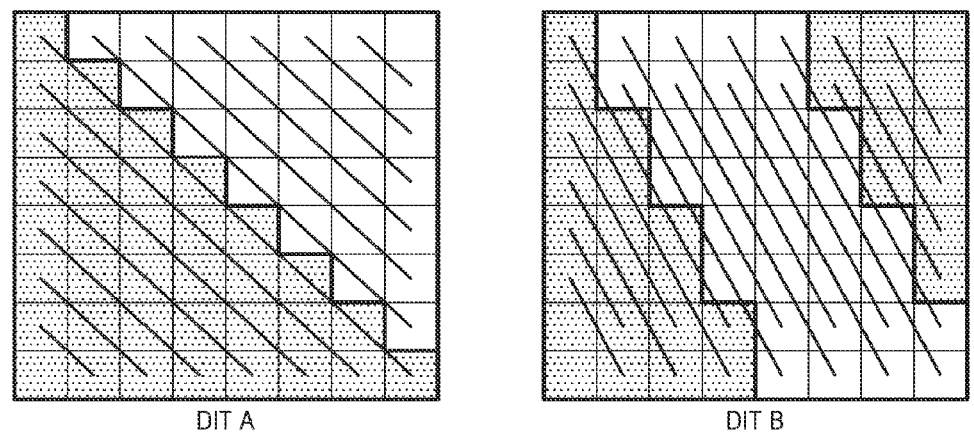
FIG. 9
FORWARD SCALE MATRIX FOR DIT A
| 4000h | 4000h | 4000h | 4000h | 4000h | 4000h | 4000h | 4000h |
|---|---|---|---|---|---|---|---|
| 4000h | 4000h | 41FEh | 3C55h | 39F8h | 4000h | 3C5Ch | 4000h |
| 4000h | 41FEh | 3716h | 4B94h | 3440h | 328Eh | 37B6h | 3443h |
| 4000h | 3C55h | 4B94h | 4A5Eh | 3093h | 4A31h | 384Fh | 498Ch |
| 4000h | 39F8h | 3440h | 3093h | 2D43h | 42E7h | 49BBh | 3A32h |
| 4000h | 4000h | 328Eh | 4A31h | 42E7h | 2D43h | 343Dh | 49BBh |
| 4000h | 3C5Ch | 37B6h | 384Fh | 49BBh | 343Dh | 4026h | 2DD6h |
| 4000h | 4000h | 3443h | 498Ch | 3A32h | 49BBh | 2DD6h | 3FDFh |
FIG. 10

INVERSE SCALE MATRIX FOR DIT A

| 4000h | 4000h | 4000h | 4000h | 4000h | 4000h | 4000h | 4000h |
|---|---|---|---|---|---|---|---|
| 4000h | 4000h | 3E11h | 43E4h | 46A8h | 4000h | 43DCh | 4000h |
| 4000h | 3E11h | 4A5Bh | 3632h | 4E65h | 5104h | 4986h | 4E60h |
| 4000h | 43E4h | 3632h | 3714h | 5452h | 3735h | 48BEh | 37B1h |
| 4000h | 46A8h | 4E65h | 5452h | 5A7Fh | 3D39h | 378Dh | 4661h |
| 4000h | 4000h | 5104h | 3735h | 3D39h | 5A7Fh | 4E68h | 378Dh |
| 4000h | 43DCh | 4986h | 48BEh | 378Dh | 4E68h | 3FDAh | 595Dh |
| 4000h | 4000h | 4E60h | 37B1h | 4661h | 378Dh | 595Dh | 4021h |

*FIG. 11*

FORWARD SCALE MATRIX FOR DIT B

| 4000h | 4000h | 4000h | 4000h | 4000h | 4000h | 4000h | 4000h |
|---|---|---|---|---|---|---|---|
| 4000h | 4000h | 4000h | 4000h | 4000h | 4000h | 4000h | 4000h |
| 4000h | 4000h | 4000h | 4000h | 4000h | 4000h | 3C5Ch | 4000h |
| 4000h | 4000h | 4000h | 4000h | 4000h | 4000h | 3C5Ch | 4000h |
| 4000h | 3C5Ch | 37B6h | 37B6h | 37B6h | 37B6h | 37B6h | 3443h |
| 4000h | 3C5Ch | 37B6h | 37B6h | 37B6h | 37B6h | 37B6h | 3443h |
| 4000h | 4000h | 3443h | 498Ch | 498Ch | 498Ch | 498Ch | 498Ch |
| 4000h | 4000h | 3443h | 498Ch | 498Ch | 498Ch | 498Ch | 498Ch |

*FIG. 12*

INVERSE SCALE MATRIX FOR DIT B

| 4000h | 4000h | 4000h | 4000h | 4000h | 4000h | 4000h | 4000h |
|---|---|---|---|---|---|---|---|
| 4000h | 4000h | 4000h | 4000h | 4000h | 4000h | 4000h | 4000h |
| 4000h | 4000h | 4000h | 4000h | 4000h | 4000h | 43DCh | 4000h |
| 4000h | 4000h | 4000h | 4000h | 4000h | 4000h | 43DCh | 4000h |
| 4000h | 43DCh | 4986h | 4986h | 4986h | 4986h | 4986h | 4E60h |
| 4000h | 43DCh | 4986h | 4986h | 4986h | 4986h | 4986h | 4E60h |
| 4000h | 4000h | 4E60h | 37B1h | 37B1h | 37B1h | 37B1h | 37B1h |
| 4000h | 4000h | 4E60h | 37B1h | 37B1h | 37B1h | 37B1h | 37B1h |

*FIG. 13*

FAST INTEGER AND DIRECTIONAL TRANSFORMS FOR DATA ENCODING

CROSS REFERENCES TO RELATED APPLICATIONS

This application is a divisional of U.S. application Ser. No. 12/709,343, now U.S. Pat. No. 8,537,899, entitled "Fast Integer and Directional Transforms for Data Encoding" the entirety of which is incorporated herein by reference.

TECHNICAL FIELD

The present disclosure generally relates to compression and encoding and, in particular, relates to Fourier-related transforms, fast integer transforms and related transform operations.

BACKGROUND

Video compression refers to reducing the quantity of data used to represent video images and often combines image compression and motion compensation. A video codec is a device, or process implemented in software executed by a general purpose computing system (or in hardware by logic circuitry), that enables video compression and decompression for digital video. Traditionally, video codecs apply various spatial and temporal transforms (such as discrete cosine transforms and the like) on the two-dimensional frames that make up a video sequence in order to reduce the raw data that must be stored on a storage medium or transmitted across a network.

The Discrete Cosine Transform (DCT) is used widely in image or video processing and compression. For a first order Markov source with a large correlation coefficient, the DCT actually approximates the Karhunen-Loeve Transform (KLT), providing optimal or near optimal energy compaction performance for this type of source. Because common images are well modeled by such a source, the DCT has gained wide application in many image and video compression codecs and standards, such as H.264.

The popularity of the DCT in image processing has led to the design of a large number of fast approximations. These approximations can be put into two categories based on whether they form a true DCT approximation or not. For example, the BinDCT uses a lifting based factorization of the true DCT, and uses rounding to implement multiplications with arithmetic shift operations. The ICT used in H.264, however, is designed to be an easily implemented transform with good coding performance without specifically having a requirement to match the DCT basis.

Another common theme in the design of fast integer transforms is the concentration on power of 2 transform lengths— specifically 4, 8 and 16. There has been little investigation in fast integer approximations to the DCT for other lengths.

SUMMARY

The present invention provides methods, apparatuses and systems directed to frequency domain transforms, including fast integer transforms and directional integer transforms. The present invention, in some implementations, is directed to a novel video codec that utilizes a novel class of fast integer and directional transforms.

DESCRIPTION OF THE DRAWINGS

FIG. 8 illustrates example transform directions and partitions.

FIG. 9 illustrates an example first pass transform direction.

FIGS. 10 thru 13 are tables illustrating example scale factors.

DESCRIPTION OF EXAMPLE EMBODIMENT(S)

Figure 1:
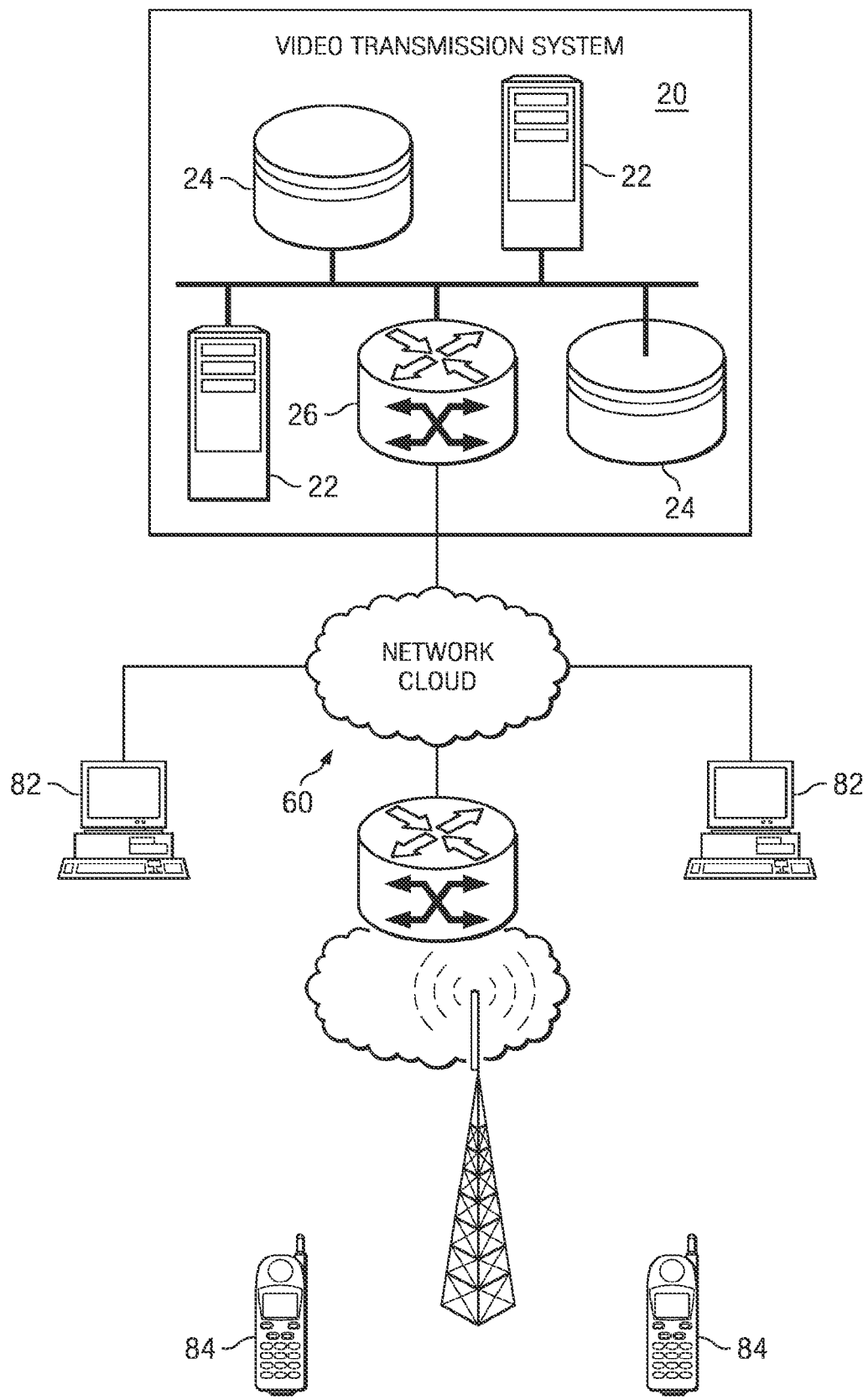
FIG. 1 is a schematic diagram illustrating a computer network environment in which implementations of the invention may operate.

The following example embodiments are described and illustrated in conjunction with apparatuses, methods, and systems which are meant to be illustrative, not limiting in scope.

A. Overview

The following description sets forth novel one-dimensional fast integer transforms and two-dimensional or block level integer transforms that utilize the one-dimensional fast integer transforms. Also presented is a novel codec that achieves high performance video compression. In some implementations, the transforms are designed without the need for the transform matrix to be factorized. This allows the design of arbitrary length transforms with arbitrary transform matrices.

The usual form of the DCT used in image and video compression is as follows:

$$X_i = s_i \sqrt{\frac{2}{N}} \sum_{n=0}^{N-1} x_n \cos\left[\frac{\pi}{N}\left(n + \frac{1}{2}\right)i\right]$$

Where i=0, ..., N−1 and $$s_i = \begin{cases} 1/\sqrt{2} & i = 0 \\ 1 & \text{otherwise} \end{cases}$$

The foregoing equation represents the DCT-II in an orthogonal form. A naive implementation requires $N^2$ floating point multiplications. The following describes the design and implementation of fast integer transforms approximating the DCT II for lengths N=2 to 8 and 16. In some implementations, the fast integer transforms, described herein, also approximate the DCT II as closely as possible both in basis functions and frequency response; allow a fast implementation in both software and hardware without requiring a multiplier; in software implementations, reduce or minimize the number of temporary registers required; increase dynamic range as little as possible; allow 12-bit data to be transformed using 16-bit arithmetic; and/or accommodate an implementation in software using common vector instruction sets.

To facilitate a concise multiplierless transform, the outputs of the transform may include a scaling factor. When the transform is applied to an image compressor, these scaling factors can be included within the normal quantization process by combining them with the quantization matrix. However, in order to retain both the precision and to restrict any increase in dynamic range, the scale factors, in some implementations, range between 0.5 and 2.0. This results in only a single bit loss of precision and a single bit increase in dynamic range respectively. Some or all of the properties described above may be used to inform the design of a cost function used by a genetic programming algorithm, and the design of the transform language, to create a fast integer transform as described below.

A.1. Transform Design Using Genetic Programming

Genetic programming can be used to design a fast integer approximation of a transform. The process, in one implementation, can be summarized as follows:

The target transform is described by its transform matrix.
A closed language is designed to describe the transform.
A population of candidate transforms is generated from a seed.
The following process is repeated until convergence criteria are met.
The population is tested against the target using a cost function.
The population is sorted such that the least cost comes first.
A new population is generated by applying mutation and combination operators to transforms from samples using an exponential from the current population.

It should be noted that this process is not specific to the DCT, and in fact can be used to design a transform that will reflect an arbitrary transformation matrix. A possible application of this process, for example, is the design of a fast integer approximation to the Discrete Tchebichef Transform (DTT) of arbitrary length. The following sections describe the transform design genetic programming algorithm in detail.

Transform Language

The following defines a language that can be used to describe a transform such that it may be manipulated with genetic operations. This language is closed such that any genetic operations performed on one or more transforms will produce a valid transform as output. To facilitate implementation of the transforms with integer operations, but without multiplications, some implementations use a lifted structure. In one implementation, all integer operations have an exact inverse such that the inverse transform may be formed directly from the forward transform by reversing the order of operations and inverting them.

The transform is defined on a set of values $x_i$, where $i=0, \ldots, N-1$. The transform is an ordered set of operations on these values. In one implementation, the basic operations used are the lifted butterfly, the shifted add and the shifted subtract. The function butterfly(i, j) is defined for a pair of values $(x_i, x_j)$ as follows:

$$x_j' = (x_j - x_i) >> 1$$

$$x_i' = x_i + x_j',$$

where $>>$ indicates an arithmetic right shift. The inverse butterfly is as follows:

$$x_i' = x_i - x_j$$

$$x_j' = 2x_j + x_i'.$$

The functions shiftadd(i, j, s) and shiftsub(i, j, s) are defined for a pair of values $(x_i, x_j)$ and shift s as follows:

$$x_i' = x_i \pm (x_j >> s),$$

where the inverse trivially has the sign inverted.

In some implementations, the butterfly operation and its inverse do not maintain perfect reconstruction. There is a small rounding error introduced by the shift operation. It should also be noted that more accurate results can be obtained with the use of rounding when applying the shift operation. This is omitted in some implementations in order to reduce the cost of the transform. Instead, the accuracy of the transform may be maintained by the use of a fixed point representation, which reduces the effect of the rounding errors. The rounded versions of shiftadd(i, j, s) and shiftsub(i, j, s) are as follows:

$$x_i' = x_i \pm ((x_j + 2^{s-1}) >> s).$$

This transform language can be implemented in software using a 32-bit opcode describing the operation. The four bytes of the opcode from the least significant are interpreted as the operation type, the main register i, the aux register j, and the shift s. The values are restricted to be within the valid ranges i, j=0 ... N-1 and s=0 ... 5. A transform is then uniquely described by a list of opcodes $O_i$ and a length l.

Initial Transform Structure

To maintain a flat DC basis function, the seed used for each transform, in one implementation, is a set of butterflies, applied initially on the inputs, and then recursively on the low pass outputs of the previous stage. In one implementation, the butterflies are as follows: butterfly (i, N-1-i=0 ... (N/2)-1. For example, where N=7 the following transform is used as the initial seed:

butterfly(0, 6)
butterfly(1, 5)
butterfly(2, 4)
butterfly(0, 3)
butterfly(1, 2)
butterfly(0, 1)

Additionally, when N is even, the DCT transform matrix can be factored into two matrices of half the size, where one of the matrices is the DCT transform matrix for N/2. Using this property, we can form a better seed when N is even by using the best resulting transform found for N/2 and applying it to the first half of the coefficients after the first set of butterflies. Note that this process implicitly includes the recursively applied butterflies as they are already present in the N/2 transform.

Cost Function

To test how well a particular transform performs, a cost function is applied. This cost function is based on comparing the scaling functions from the transform with the ideal basis functions from the transform matrix. We can represent the basis functions for the desired transform as $D_{ij}$ (where each Di has unit norm) and the scaling functions for the tested transform as $S_{ij}$. The scaling functions can be found by passing a shifted delta function through the inverse transform.

$$S_i = \text{invtransform}(\delta_i)$$

The best match for each scaling function $S_i$ can be found with the desired basis functions $D_j$, initially testing all $D_j$, and then subsequently checking only basis functions not already matched. The best match is determined as the match with the best absolute correlation coefficient (in one embodiment, ignoring sign). We can represent the permutation of the best matches as $j=P(i)$ such that $D_j$ is the best match for $S_i$. This provides an initial cost function of:

$$K = \sum_i cor(S_i, D_{P(i)})$$

DC leakage into the AC subbands may be undesirable, especially for the odd length transforms, but also any transform not a power of two. In these cases, the use of only shifts may lead to some DC leakage in some of the AC subbands. For this reason, a factor may be used to bias against DC leakage. Note in this case the DC scaling function is assumed to be $S_0$ (this is enforced in one implementation for simplicity). With this factor the cost function becomes:

$$K = \sum_i cor(S_i, D_{P(i)}) + \alpha_0 \sum_j S_{i,j}$$

where $\alpha_0$ is a weighting factor. To minimize the number of operations, another clause that weights the length of the transform may be utilized. For each length transform we define a nominal length $l_0$ which is the expected minimum number of opcodes for the transform. The cost function becomes:

$$K = \sum_i cor(S_i, D_{P(i)}) + \alpha_0 \sum_j S_{i,j} + \alpha_1 (l - l_0)^2$$

where $\alpha_1$ is a weighting factor. Another factor that is included in the cost function is a factor that ensures that the scale of the transform outputs (relative to the DC scale) does not exceed 2.0 or get lower than 0.5. This can be achieved by using the following cost function:

$$Q_i = \begin{cases} \frac{\|S_i\|}{\|S_0\|} & \|S_i\| > \|S_0\| \\ \frac{\|S_0\|}{\|S_i\|} & \text{otherwise} \end{cases}$$

Such that the cost function becomes:

$$K = \sum_i cor(S_i, D_{P(i)}) + \alpha_0 \sum_j S_{i,j} + \alpha_1 (l - l_0)^2 + \alpha_2 (Q_i - 1)^4$$

Genetic Operations

In order to generate a new population, a set of genetic operations is applied to the transforms from the old population. These genetic operations take one or more transforms $O_i$ from the old population and form a single transform for the new population. The operations include:
  A point mutation, where a single operation is replaced with a randomly generated operation.
  A splice between two transforms, where a random length from the initial section of a first transform is spliced to a random length from the trailing section of a second transform.
  A splice between two transforms, where a random section within the first transform is removed and replaced by a random section cut from the second transform.
  A deletion, where a random section of a transform is deleted.
  A permutation where two random operations from the transform are swapped.
A point mutation and a permutation may also be applied multiple times.

A.2. Family of Fast Integer Transforms

Application of the preceding genetic programming processes to the design of transforms approximating the DCT for lengths N=2 to 8 and length 16 has resulted in a set of multiplierless, fast-integer transforms as described below. The following sections describe each of the resulting transforms and their properties. Only the forward transform is described for each transform. The inverse transform may be formed by reversing the order of the basic operations, and inverting them. Note that the scaling vector and permutation vector are presented for the output coefficients of the forward transform. The scaling vector provides the scale required to normalize the output and the permutation vector gives a corresponding output index for the canonical DCT. Note that the scale vectors are given in their inverse form below (i.e., to divide the output of the forward transform), as this form facilitates the creation of ideal quantizers.

Transform N=2

The N=2 transform is the same as the initial seed for N=2. It becomes the first butterfly and nothing else. The following pseudo code implements the forward transform:

$x[1]=(x[1]-x[0])\gg 1$;

$x[0]=x[0]+x[1]$;

The following table provides the scale and permutation vectors for the N=2 transform. The frequency response of this transform is essentially identical to that of the DCT for this trivial case. Since application of a given FIT may result in shifting of the DCT coefficients out of order, the permutation vector allows for determination of actual position of each numbered coefficient in the resulting output.

| x[0] | 0.7071 | 0 |
| x[1] | −0.7071 | 1 |

Transform N=3

Figure 6A:
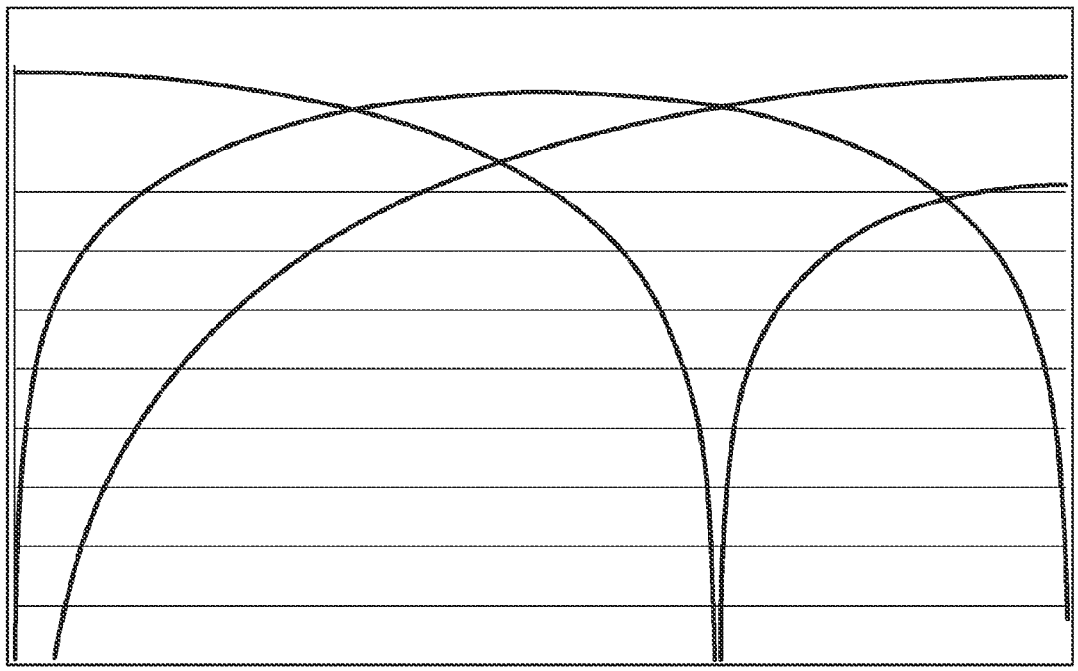
FIGS. 6a and 6b illustrate example DCT and FIT frequency responses of a fast integer transform.
Figure 6B:
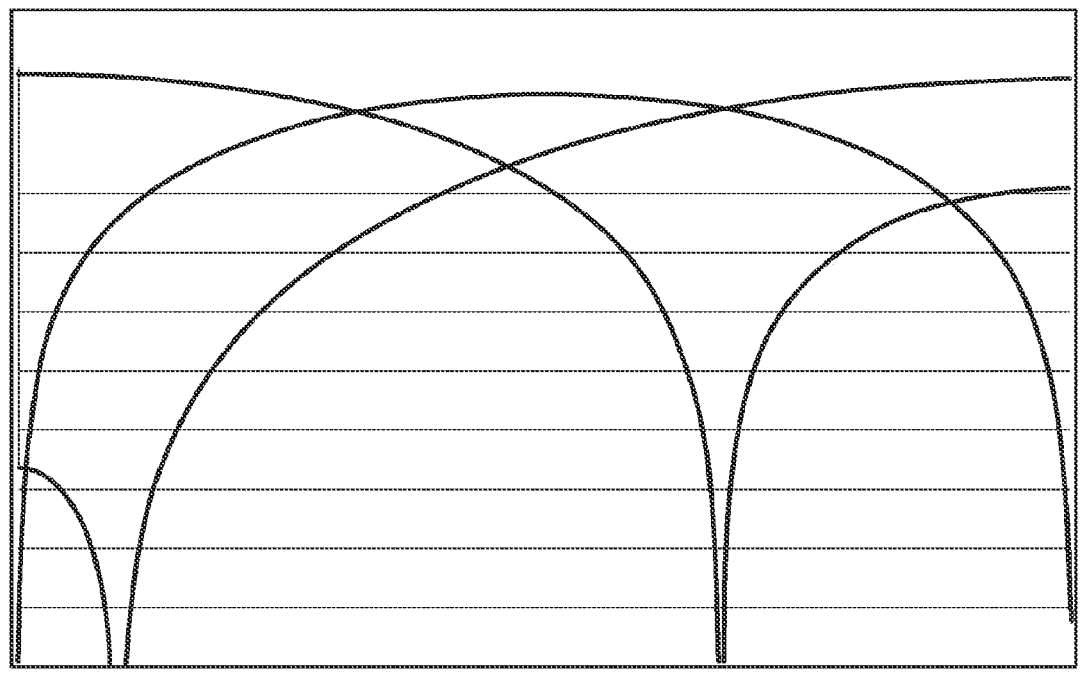

The following pseudo code implements a forward transform for a N=3 transform:

$x[2]=(x[2]-x[0])\gg 1$;

$x[0]+=x[2]$;

$x[1]=(x[1]-x[0])\gg 1$;

$x[0]+=x[1]$;

$x[0]-=x[1]\gg 4$;

$x[0]-=x[1]\gg 2$;

The following table provides the scale and permutation vectors for the transform, while FIGS. 6a and 6b illustrate the frequency response of the DCT and FIT transforms, respectively.

| x[0] | 0.5774 | 0 |
| x[1] | −0.6122 | 2 |
| x[2] | −0.7071 | 1 |

Transform N=4

The following pseudo code implements a forward transform for a N=4 transform:

$x[3]=(x[3]-x[0])\gg 1$;

$x[0]+=x[3]$;

$x[2]=(x[2]-x[1])\gg 1$;

$x[1]+=x[2]$;

$x[1]=(x[1]-x[0])>>1;$ $x[0]+=x[1];$ $x[2]+=x[3]>>2;$ $x[3]-=x[2]>>1;$ $x[2]=(x[2]-x[3])>>1;$ $x[3]+=x[2];$

Figure 7A:
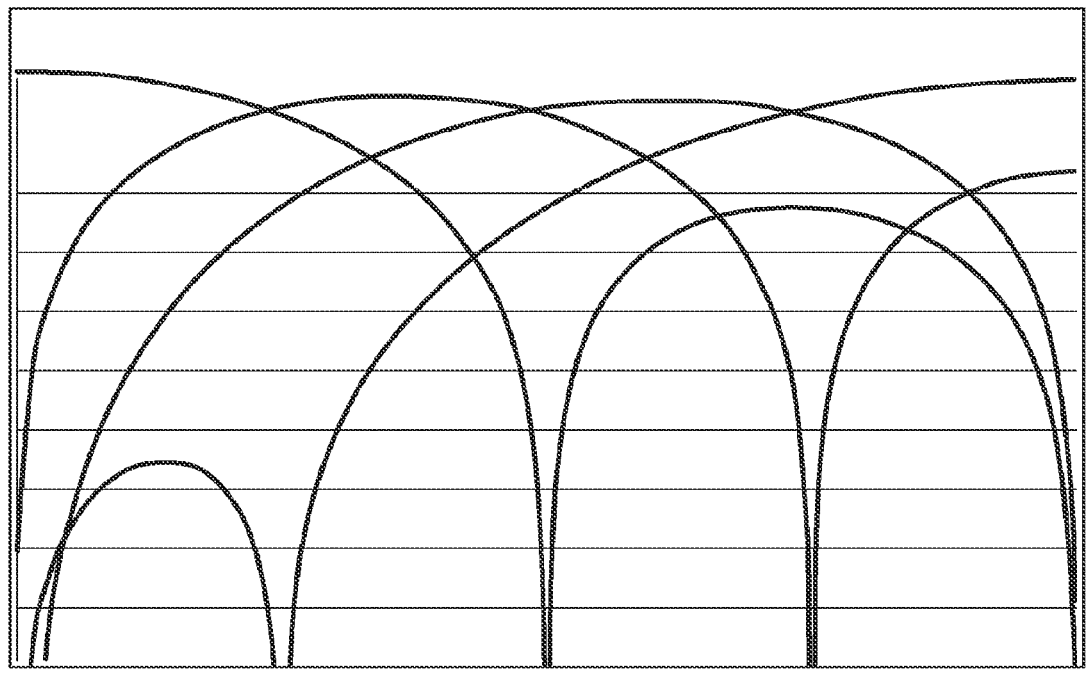
FIGS. 7a and 7b illustrate example DCT and FIT frequency responses of a fast integer transform.
Figure 7B:
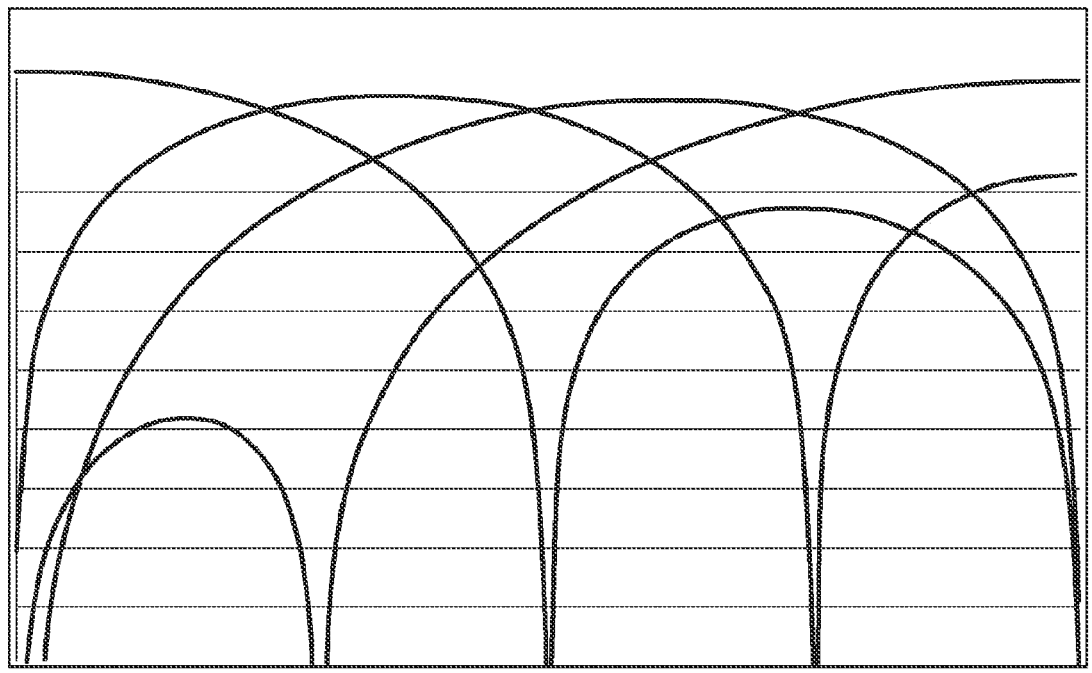

The following table provides the scale and permutation vectors, while FIGS. 7a and 7b illustrate the frequency response of the DCT and FIT transforms respectively.

| | | |
|---|---|---|
| x[0] | 0.5000 | 0 |
| x[1] | −0.5000 | 2 |
| x[2] | 0.5744 | 3 |
| x[3] | −0.4351 | 1 |

Transform N=5

The following pseudo code implements a forward transform for a N=5 transform:

$x[4]=(x[4]-x[0])>>1;$ $x[0]+=x[4];$ $x[3]=(x[3]-x[1])>>1;$ $x[1]+=x[3];$ $x[2]=(x[2]-x[0])>>1;$ $x[0]+=x[2];$ $x[1]=(x[1]-x[0])>>1;$ $x[0]+=x[1];$ $x[0]+=x[1]>>5;$ $x[0]-=x[1]>>3;$ $x[0]+=x[2]>>5;$ $x[2]-=x[1]>>4;$ $x[1]-=x[2]>>3;$ $x[2]+=x[1]>>1;$ $x[0]-=x[2]>>2;$ $x[4]+=x[3]>>5;$ $x[3]=(x[3]-x[4])>>1;$ $x[4]+=x[3];$ $x[3]+=x[4]>>2;$ $x[4]-=x[3]>>2;$

The following table provides the scale and permutation vectors for the transform.

| | | |
|---|---|---|
| x[0] | 0.4472 | 0 |
| x[1] | −0.4937 | 4 |
| x[2] | −0.5661 | 2 |
| x[3] | 0.5083 | 3 |
| x[4] | −0.4918 | 1 |

Transform N=6

The following pseudo code implements a forward transform for a N=6 transform:

$x[5]=(x[5]-x[0])>>1;$ $x[0]+=x[5];$ $x[4]=(x[4]-x[1])>>1;$ $x[1]+=x[4];$ $x[3]=(x[3]-x[2])>>1;$ $x[2]+=x[3];$ $x[2]=(x[2]-x[0])>>1;$ $x[0]+=x[2];$ $x[1]=(x[1]-x[0])>>1;$ $x[0]+=x[1];$ $x[0]-=x[1]>>5;$ $x[0]-=x[1]>>4;$ $x[0]-=x[1]>>2;$ $x[3]=(x[3]-x[5])>>1;$ $x[5]+=x[3];$ $x[3]-=x[4]>>2;$ $x[4]-=x[3]>>5;$ $x[4]=(x[4]-x[3])>>1;$ $x[3]+=x[4];$ $x[4]-=x[3]>>3;$ $x[3]-=x[4]>>5;$ $x[3]-=x[4]>>3;$ $x[5]=(x[5]-x[4])>>1;$ $x[4]+=x[5];$

The following table provides the scale and permutation vectors for the transform.

| | | |
|---|---|---|
| x[0] | 0.4082 | 0 |
| x[1] | −0.4330 | 4 |
| x[2] | −0.5000 | 2 |
| x[3] | 0.3521 | 3 |
| x[4] | −0.3543 | 1 |
| x[5] | −0.3543 | 5 |

Transform N=7

The following pseudo code implements a forward transform for a N=7 transform:

$x[6]=(x[6]-x[0])>>1;$ $x[0]+=x[6];$ $x[5]=(x[5]-x[1])>>1;$ $x[1]+=x[5];$ $x[4]=(x[4]-x[2])>>1;$ $x[2]+=x[4];$ $x[3]=(x[3]-x[0])>>1;$ $x[0]+=x[3];$ $x[2]=(x[2]-x[1])>>1;$ $x[1]+=x[2];$ $x[1]=(x[1]-x[0])>>1;$ $x[0]+=x[1];$ $x[0]+=x[1]>>5;$ $x[2]+=x[1]>>1;$ $x[1]-=x[2]>>5;$ $x[1]-=x[2]>>2;$ $x[0]+=-x[1]>>3;$ $x[3]+=x[1]>>5;$ $x[0]-=x[3]>>3;$ $x[3]+=x[1]>>2;$ $x[2]+=x[3]>>1;$ $x[2]=(x[2]-x[3])>>1;$ $x[3]+=x[2];$ $x[0]+=x[2]>>4;$ $x[1]+=x[3]>>4;$ $x[4]+=-x[6]>>4;$ $x[5]+=x[4]>>1;$ $x[5]-=x[6]>>4;$ $x[5]=(x[5]-x[6])>>1;$ $x[6]+=x[5];$ $x[6]+=x[4]>>5;$ $x[4]-=x[6]>>1;$ $x[6]-=x[5]>>3;$ $x[4]=(x[4]-x[5])>>1;$ $x[5]+=x[4];$ $x[5]-=x[4]>>2;$

The following table provides the scale and permutation vectors for the transform.

| | | |
|---|---|---|
| x[0] | 0.3780 | 0 |
| x[1] | −0.3666 | 4 |
| x[2] | 0.3201 | 6 |
| x[3] | −0.4980 | 2 |
| x[4] | −0.3616 | 5 |
| x[5] | 0.4631 | 3 |
| x[6] | −0.5278 | 1 |

Transform N=8

The following pseudo code implements a forward transform for a N=8 transform:

$x[7]=(x[7]-x[0])>>1;$ $x[0]+=x[7];$ $x[6]=(x[6]-x[1])>>1;$ $x[1]+=x[6];$ $x[5]=(x[5]-x[2])>>1;$ $x[2]+=x[5];$ $x[4]=(x[4]-x[3])>>1;$ $x[3]+=x[4];$ $x[3]=(x[3]-x[0])>>1;$ $x[0]+=x[3];$ $x[2]=(x[2]-x[1])>>1;$ $x[1]+=x[2];$ $x[1]=(x[1]-x[0])>>1;$ $x[0]+=x[1];$ $x[3]-=x[2]>>5;$ $x[2]+=x[3]>>2;$ $x[3]-=x[2]>>1;$ $x[2]=(x[2]-x[3])>>1;$ $x[3]+=x[2];$ $x[4]+=x[7]>>2;$ $x[5]-=x[6]>>4;$ $x[6]-=x[5]>>4;$ $x[5]+=x[6]>>2;$ $x[7]-=x[4]>>1;$ $x[4]-=x[7]>>5;$ $x[4]+=x[7]>>1;$ $x[6]-=x[5]>>3;$ x[7]-=x[4]>>4;

x[4]-=x[7]>>3;

x[4]=(x[4]-x[6])>>1;

x[6]+=x[4];

x[5]=(x[5]-x[7])>>1;

x[7]+=x[5];

x[6]=(x[6]-x[7])>>1;

x[7]+=x[6];

The following table provides the scale and permutation vectors for the transform.

| | | |
|---|---|---|
| x[0] | 0.3536 | 0 |
| x[1] | −0.3536 | 4 |
| x[2] | 0.4108 | 6 |
| x[3] | −0.3043 | 2 |
| x[4] | −0.5000 | 5 |
| x[5] | 0.5000 | 3 |
| x[6] | 0.3528 | 7 |
| x[7] | −0.3543 | 1 |

Transform N=16

The following pseudo code implements a forward transform for a N=16 transform:

x[15]=(x[15]-x[0])>>1;

x[0]+=x[15];

x[14]=(x[14]-x[1])>>1;

x[1]+=x[14];

x[13]=(x[13]-x[2])>>1;

x[2]+=x[13];

x[12]=(x[12]-x[3])>>1;

x[3]+=x[12];

x[11]=(x[11]-x[4])>>1;

x[4]+=x[11];

x[10]=-(x[10]-x[5])>>1;

x[5]+=x[10];

x[9]=(x[9]-x[6])>>1;

x[6]+=x[9];

x[8]=(x[8]-x[7])>>1;

x[7]+=x[8];

x[7]=(x[7]-x[0])>>1;

x[0]+=x[7];

x[6]=(x[6]-x[1])>>1;

x[1]+=x[6];

x[5]=(x[5]-x[2])>>1;

x[2]+=x[5];

x[4]=(x[4]-x[3])>>1;

x[3]+=x[4];

x[3]=(x[3]-x[0])>>1;

x[0]+=x[3];

x[2]=(x[2]-x[1])>>1;

x[1]+=x[2];

x[1]=(x[1]-x[0])>>1;

x[0]+=x[1];

x[3]-=x[2]>>5;

x[2]+=x[3]>>2;

x[3]-=x[2]>>1;

x[2]=(x[2]-x[3])>>1;

x[3]+=x[2];

x[4]+=-x[7]>>2;

x[5]-=[6]>>4;

x[6]-=x[5]>>4;

x[5]+=[6]>>2;

x[7]-=x[4]>>1;

x[4]-=x[7]>>5;

x[4]+=x[7]>>1;

x[6]-=x[5]>>3;

x[7]-=x[4]>>4;

x[4]-=x[7]>>3;

x[4]=(x[4]-x[6])>>1;

x[6]+=x[4];

x[5]=(x[5]-x[7])>>1;

x[7]+=x[5];

x[6]=(x[6]-x[7])>>1;

x[7]+=x[6];

x[8]+=x[15]>>2;

x[9]-=x[14]>>3;

x[9]-=x[14]>>1;

x[10]-=x[13]>>5;

x[10]+=x[13]>>2;

x[11]-=x[12];

x[14]+=x[9];

$x[14] -= x[9] >> 3;$ $x[9] -= x[14] >> 1;$ $x[12] += x[11];$ $x[15] -= x[8] >> 1;$ $x[8] += x[15] >> 4;$ $x[11] -= x[12];$ $x[12] += x[11] >> 5;$ $x[13] -= x[10] >> 2;$ $x[15] -= x[8] >> 4;$ $x[8] += x[15] >> 1;$ $x[11] = (x[11] - x[8]) >> 1;$ $x[8] += x[11];$ $x[12] -= x[8] >> 2;$ $x[13] -= x[10] >> 5;$ $x[9] = (x[9] - x[10]) >> 1;$ $x[10] += x[9];$ $x[14] = (x[14] - x[13]) >> 1;$ $x[13] += x[14];$ $x[9] -= x[13] >> 4;$ $x[14] += x[10] >> 3;$ $x[14] = (x[14] - x[8]) >> 1;$ $x[8] += x[14];$ $x[15] = (x[15] - x[12]) >> 1;$ $x[12] += x[15];$ $x[15] += x[11] >> 3;$ $x[10] = (x[10] - x[15]) >> 1;$ $x[15] += x[10];$ $x[15] -= x[8] >> 1;$ $x[8] += x[15] >> 2;$ $x[11] + x[12] >> 3;$ $x[11] = (x[11] - x[9]) >> 1;$ $x[9] += x[11];$ $x[13] = (x[13] - x[12]) >> 1;$ $x[12] += x[13];$ $x[12] = (x[12] - x[9]) >> 1;$ $x[9] += x[12];$ $x[14] += x[10] >> 1;$ $x[14] = (x[14] - x[10]) >> 1;$ $x[10] += x[14];$ $x[10] -= x[14] >> 1;$

The following table provides the scale and permutation vectors for the transform.

| | | |
|---|---|---|
| x[0] | 0.2500 | 0 |
| x[1] | −0.2500 | 8 |
| x[2] | 0.2905 | 12 |
| x[3] | −0.2152 | 4 |
| x[4] | −0.3536 | 10 |
| x[5] | 0.3535 | 6 |
| x[6] | 0.2495 | 14 |
| x[7] | −0.2505 | 2 |
| x[8] | −0.3416 | 5 |
| x[9] | −0.2532 | 15 |
| x[10] | 0.3466 | 3 |
| x[11] | 0.3561 | 9 |
| x[12] | −0.2467 | 1 |
| x[13] | 0.3507 | 7 |
| x[14] | 0.1802 | 13 |
| x[15] | −0.3659 | 11 |

As discussed below, this or similar families of FITs can be used in 2D DCT operations, as well as directional integer transforms.

B. DCT-Like 8×8 Directional Integer Transforms

The following presents a novel family of DCT-like 8×8 directional integer transforms. These transforms are designed to exploit directional image features to improve compression performance. These new transforms are fast enough to be used in real-time coding applications, such as encoding of video streams.

B.1. Introduction

The Discrete Cosine Transform (DCT) is widely used in image compression because of its ability to successfully de-correlate common image features, and also because of the existence of many fast algorithms for implementing it. The DCT is a separable transform formed from a 1D DCT applied both vertically and horizontally to a block of pixels. Because of this, it deals well with smooth image features, and to some degree with edges aligned either horizontally or vertically. In these cases, the alignment of the edges to the transform direction helps to compact the energy into a single line of the coefficients.

Many common images consist, however, of edges following arbitrary directions. As such, in order to obtain good compression performance on a wider range of images, it is desirable to find a transform that provides good energy compaction along more than just the horizontal and vertical directions. A family of transforms can be constructed by applying a 1D DCT along several well defined diagonal directions. In the implementations described herein, a set of directional transforms can be constructed by applying the family of 1D Fast Integer Transforms (FIT) presented above in Section A. The use of the FIT transforms allows the directional transforms to be calculated quickly enough for real time use and, in some implementations, also obviates the need for complicated DC correction procedures.

The following sections examine the new transforms in detail. These new transforms can be implemented in an image or video encoder as discussed in Section C, below.

B.2. Directional Integer Transform

The family of directional integer transforms, in one embodiment, include six distinct directional transforms. Each transform is defined by the major diagonal axis along which the transform de-correlates. However, in one implementation, they all follow the same four-pass design described below.

The first pass includes application of 1D transforms along a given diagonal direction. The second pass includes scaling to reverse the scaling inherent in the FIT transforms. After that, the coefficients are grouped into suitable partitions, and another pass is made with FIT transforms along same numbered coefficients from the first pass. The six transform directions and associated partitions are illustrated in FIG. 8.

As FIG. 8 shows, these six directions cover the angles ±45°, ±63.4° and ±26.6°. Together with the standard separable 2D DCT, these directional transform angles cover all the possible edge directions well. Due to symmetry, the six different transforms can be formed easily from a pair of basic transforms by applying a vertical flip or transpose, or both, before the transform. For this reason, the first and third transforms illustrated in FIG. 8 were chosen as the basic transforms. These transforms are referred to as DIT A for the 45° direction and DIT B for the 63.4° direction.

Diagonal Transform Pass

The first pass involves performing the 1D FIT along the main diagonal direction. This is illustrated in FIG. 9. Each diagonal line in FIG. 9 represents an application of the FIT of the correct length, with the DC coefficient on the top left. With the items to be transformed numbered from 0-63 in a standard raster order, the following pseudo code implements the first pass for the forward DIT A:

FIT2(6, 15);
FIT3(5, 14, 23);
FIT4(4, 13, 22, 31);
FIT5(3, 12, 21, 30, 39);
FIT6(2, 11, 20, 29, 38, 47);
FIT7(1, 10, 19, 28, 37, 46, 55);
FIT8(0, 9, 18, 27, 36, 45, 54, 63);
FIT7(8, 17, 26, 35, 44, 53, 62);
FIT6(16, 25, 34, 43, 52, 61);
FIT5(24, 33, 42, 51, 60);
FIT4(32, 41, 50, 59);
FIT3(40, 49, 58);
FIT2(48, 57);

The following pseudo code implements the first pass for the forward DIT B:

FIT2(40, 57);
FIT2(32, 49);
FIT3(24, 41, 58);
FIT3(16, 33, 50);
FIT4(8, 25, 42, 59);
FIT4(0, 17, 34, 51);
FIT4(9, 26, 43, 60);
FIT4(1, 18, 35, 52);
FIT4(10, 27, 44, 61);
FIT4(2, 19, 36, 53);
FIT4(11, 28, 45, 62);
FIT4(3, 20, 37, 54);
FIT4(12, 29, 46, 63);
FIT4(4, 21, 38, 55);
FIT3(13, 30, 47);
FIT3(5, 22, 39);
FIT2(14, 31);
FIT2(6, 23);

Scaling Pass

After the application of the first pass, the AC coefficients will have gained a scale factor from the FIT transform. This scale factor is removed, otherwise the basis functions may no longer be smooth after another FIT pass. At this point it is also worth mentioning the sign of the FIT outputs. In a similar way to the scale factors, the signs of each numbered output of all FIT transform lengths should have the same sign. For the DCT this is trivially true; however, the design of the FIT family allows for an individual scale factor to be negative. In order to meet this requirement, the FIT family can be specifically designed such that the signs of each numbered output matches across all lengths.

Another consideration is the shape of the DC basis functions. One of the properties of the FITs used in the DITs is that the DC coefficient is (to a good approximation) the average of the input values, and not the sum. This means that, for the DC basis functions to remain flat after another FIT pass, the DC values should remain unscaled. For this reason, the scale factors are taken relative to the DC scale factor for each transform. In order to avoid division when performing the scale, one implementation uses an integer multiply followed by a shift.

In order to be better suited to a Streaming SIMD Extensions (SSE) implementation using a packed multiply instruction (pmulhw), one implementation uses 2.14 fixed point representation of the scale, and pre-scales the input values (for both forward and inverse transforms) by four (shift left by 2) to compensate for the implied 16 bit shift in the SSE instruction. An example set of integer scale factors for the DIT A and the DIT B are given in FIGS. 10-13.

Partitioned Transform Pass

After the second pass, the coefficients are grouped into partitions as indicated by the shaded areas in FIG. 9. DIT A has two partitions separated along the diagonal, and DIT B has three partitions. These partitions are such that 1D transforms are then applied across coefficients from the first pass transforms with the same ordinal or frequency. For example, all the DC coefficients within a partition are transformed with a single FIT. Similarly all the first order or frequency AC coefficients are transformed by another FIT, all the second AC coefficients by yet another FIT, and so forth. Because the FIT outputs are permuted and as such not necessarily in the expected position, the FIT's output permutation vector is used to find the actual position of each numbered coefficient.

The partitions have several useful benefits when compared to an unpartitioned directional transform. The main benefit being that the partitions reduce the maximum length of transform required to 8, significantly reducing the overall complexity of the transform. Another benefit is a reduction in the ringing usually present after quantization. Any quantization error introduced is restricted to one of the partitions, and as such is not spread across the whole block.

After the partitioned transform pass, there are more than one DC coefficient for each transform-specifically, two DC coefficients for DIT A and three DC coefficients for DIT B. In order to end up with only a single DC coefficient, one implementation applies a FIT transform of length two or three, respectively, to the DC coefficients, leaving only a single coefficient.

The following pseudo code implements the partitioned transform pass for the forward DIT A:

// First partition...
FIT8(0, 8, 16, 24, 32, 40, 48, 56);
FIT7(63, 62, 52, 60, 59, 58, 57);
FIT6(27, 35, 34, 42, 41, 49);
FIT5(45, 53, 43, 51, 50);
FIT4(9, 17, 25, 33);
FIT3(36, 44, 61);
FIT2(18, 26);
// Second partition...
FIT7(1, 2, 3, 4, 5, 6, 7);
FIT6(55, 38, 39, 31, 23, 15);

FIT5(28, 20, 21, 13, 14);
FIT4(46, 29, 30, 22);
FIT3(10, 11, 12);
FIT2(37, 47);
// DC transform
FIT2(0, 1);

And the following pseudo code implements the third pass for the forward DIT B:
// First partition...
FIT8(0, 8, 16, 24, 32, 40, 48, 56);
FIT6(51, 59, 50, 58, 49, 57);
FIT4(17, 25, 33, 41);
FIT2(34, 42);
// Second partition...
FIT8(4, 12, 3, 11, 2, 10, 1, 9);
FIT8(55, 63, 54, 62, 53, 61, 52, 60);
FIT8(21, 29, 20, 28, 19, 27, 18, 26);
FIT8(38, 46, 37, 45, 36, 44, 35, 43);
// Third partition...
FIT6(7, 15, 6, 14, 5, 13);
FIT4(23, 31, 39, 47);
FIT2(22, 30);
// DC transform
FIT3(0, 4, 7);

Inverse Directional Integer Transform

Because of the way the transforms have been designed, the inverse transform can be formed by reversing the passes (making sure the DC transform comes first), substituting the corresponding inverse FIT for each forward FIT, and using the inverse scale matrix.

C. Novel Video Codec

Figure 3:
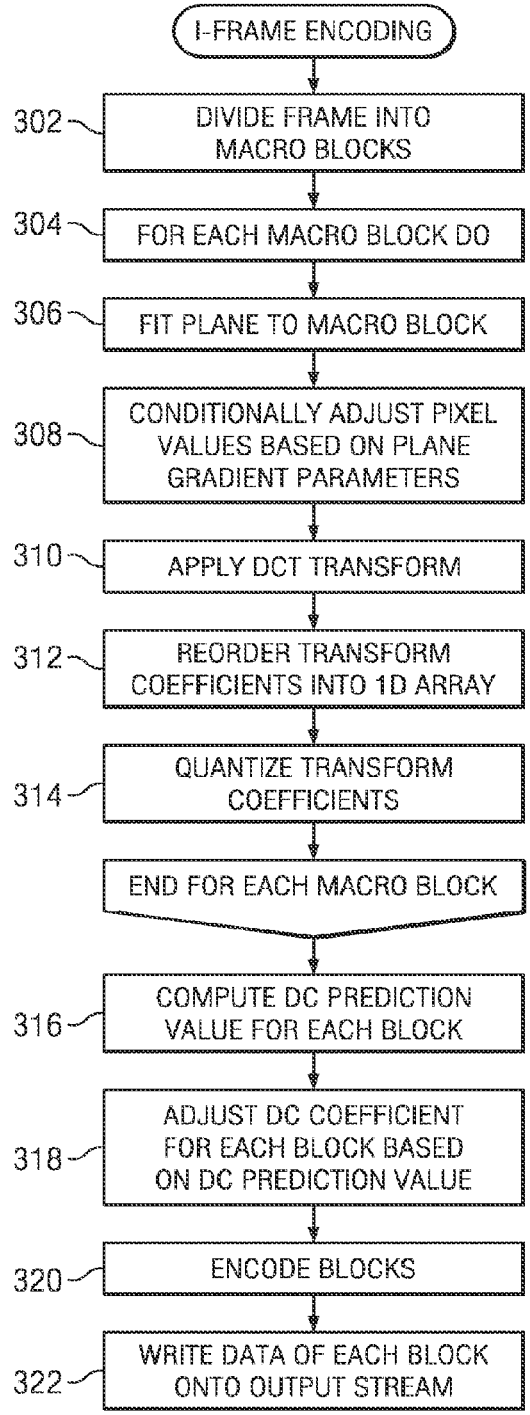
FIG. 3 is a flow chart setting forth an example method directed to encoding a video frame.

FIG. 3 illustrates an example process directed to encoding a video frame. As discussed below, the example video codec incorporates the FITs and DITs described above. Other operations that the codec, according to some implementations of the invention, may perform that are not illustrated in FIG. 3 include color space transformation and downsampling. As to color space transformation, the video codec may convert the pixel values from RGB color model values to a different color space, such as the YCbCr color space model. The YCbCr color space model has three components Y, Cb and Cr: the Y or luma component represents the brightness of a pixel, the Cb and Cr components represent the chrominance (split into blue and red components). The YCbCr color space conversion allows greater compression without a significant effect on perceptual image quality (or greater perceptual image quality for the same compression). The compression is more efficient as the brightness information, which is more important to the eventual perceptual quality of the image, is confined to a single channel, more closely representing the human visual system.

The transformation into the YCbCr color model allows the codec to choose to use downsampling, which is to reduce the spatial resolution of the Cb and Cr components (called "downsampling" or "chroma subsampling"). The ratios at which the codec applies downsampling, in one implementation, is 4:2:0 (resulting in a reduction by a factor of 2 in horizontal and vertical directions). For the rest of the compression process, the Y, Cb and Cr components are processed separately and in a very similar manner. If downsampling is chosen, then the Cb and Cr planes are processed by the codec as a pair, with the same choices being applied to both. FIG. 3 illustrates the process steps applied to the luma or Y component of the frame data. The operations applied to the chroma components of the image differ slightly as described in more detail below.

Referring now to FIG. 3, the video codec accesses the frame stored in memory and divides the frame into macroblocks (302). In one implementation, the size of each macroblock is 16 pixels by 16 pixels. As described below, the macroblock is optionally partitioned into subblocks and DCT operations are performed, in some implementations, on the subblocks using the FIT and DIT described above. Each luma macroblock may be partitioned into a single 16×16 block, two 16×8 subblocks, two 8×16 subblocks, or four 8×8 subblocks. Each downsampled chroma pair macroblock may be partitioned into a single 8×8 block or four 4×4 subblocks. However, other macroblock sizes can be used. The video codec then performs certain transform and quantization operations on the luma and chroma components of each macroblock (304) as follows. These operations can be done serially or in parallel. If the encoding operations are performed on a GPU or other highly parallel processing architecture, the processing for the macroblocks can be accomplished in parallel, resulting in reduced processing time and greater through-put.

As FIG. 3 illustrates, the codec fits a 2-dimensional plane to each macroblock that best models the luma values of the pixels of the macroblock (304). The plane is defined by the equation z=ax+by, where a and b define the gradient parameters of the plane. One suitable plane fitting algorithm involves a least squares fit method. The codec then conditionally adjusts the pixel values of the macroblock (306), making a choice whether the block benefits from such an encoding. If the plane encoding is chosen, the codec then adjusts the luma values for the pixels of the macroblock based on the plane gradient parameters. In one implementation, the codec, for each pixel, subtracts the corresponding value of the plane equation from the pixel value at that location. Conceptually, this is defined by the following equation: adjusted pixel(x,y)= pixel(x,y)−z. In one possible implementation, the codec tries a plane fit only for blocks that contain no AC coefficients. However the bitstream allows a plane fit to be signaled on any macroblock. In some implementations, when the codec tries a plane fit, the decision to actually use it or not is based on an algorithmically-defined trade off between rate and distortion. The codec, in one implementation, does not use plane fitting to adjust the values of the chroma components. The codec signals the plane encoding choice to the decoder.

The codec then applies a Discrete Cosine Transformation (DCT) to the macroblock (310), matching the respective subblock size of the luma or chroma components. In one implementation, the codec exhaustively tries each subblock size choice, choosing the subblock size that provides the best encoding. In one implementation, the codec performs the exhaustive search separately on the luma channel, and jointly on the two chroma channels and may also try each of the directional DITs during this search. When a 16×16 macroblock is partitioned into four 8×8 subblocks, the codec may apply any of the six 8×8 DITs described above on each 8×8 subblock, as well as the 8×8 FIT. The codec may also choose to further split each subblock into four 4×4 subblocks and apply a 4×4 FIT to each subblock. In this case, the codec applies a 2×2 Hadamard transform on the DC coefficients of each 4×4 subblock. In selecting the particular transform type, the codec algorithmically evaluates a tradeoff between rate and distortion. In one implementation, for example, this is most easily described as Lagrangian rate distortion optimization, according to which the codec minimizes a cost function, RDcost=Distortion+lambda*rate, and selects the transform type that leads to the minimum total Rdcost (see below). The codec signals the transform type chosen for each 8×8 subblock to the decoder. If the corresponding luma or chroma component of the macroblock has more than one subblock, then the codec applies a Hadamard transform of the necessary dimension on all the DC components of the subblocks. For example, the codec applies a 1D 2 long Hadamard transform for both the 16×8 and the 8×16 partitions, and applies a 2×2 Hadamard transform for the 8×8 partitions.

The codec reorders the DCT coefficients for a macroblock into a 1-dimensional array (312). In one implementation, DCT coefficients of the subblocks are scanned in a zigzag order to form a 1D array for each subblock. Then the 1D arrays for each subblock are interlaced to form a single array for each macroblock. In one implementation, the luma channel subblocks are separately encoded from the chroma channel subblocks. In one implementation, the two chroma channel subblocks are interlaced together in a manner similar to the luma channel. In other implementations, alternatives to zigzag re-ordering can be used.

The codec also quantizes the DCT coefficients in the 1-D array (314) using, for example, rate distortion optimization, which is a quantization process that evaluates whether to round up or down to the nearest integer, or to round to zero, based on the resulting cost (the number of bits required to encode) for each choice and the error or distortion associated with each choice. Rate-distortion optimization, in one implementation, essentially applies a video quality metric, measuring both the deviation from the source and the bit cost for each possible decision outcome. The bits are mathematically measured by multiplying the bit cost by the Lagrangian, a value representing the relationship between bit cost and quality for a particular quality level. The deviation from the source can be measured as the mean squared error, in order to maximize the Peak signal-to-noise ratio (PSNR) video quality metric. Calculating the bit cost can be accomplished by passing each block of video to be tested to the entropy coder to measure its actual bit cost.

Figure 4:
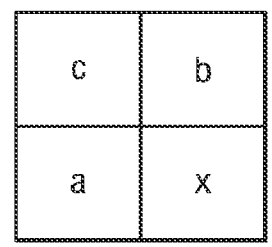
FIG. 4 is a diagram illustrating the calculation of DC prediction values based on neighboring macroblocks.

The codec then computes the DC prediction values for each macroblock (316) and adjusts the DC coefficient for each macroblock based on the DC prediction value (318), in one implementation, by subtracting the DC prediction value from the DC coefficient for the macroblock. In one implementation, the DC prediction value, X, is based on the DC coefficients of neighboring blocks, as shown in the diagram and equation set forth in FIG. 4. In other words, the DC prediction value for block X is based on the sum of the DC coefficients for blocks a and b, less the DC coefficient value of block c. In one implementation, the DC prediction value adjustments are performed on both the luma and chroma channels.

The codec then encodes the quantized coefficients into a reserved memory space for each block (320). In one implementation, the codec uses a form of variable length coding to compress the quantized coefficients for each block. In one implementation, the codec uses run-length encoding (RLE) followed by Huffman coding. After encoding the quantized DCT coefficients for each macroblock, the result is the encoded bits for the macroblock and a bit-length. With knowledge of the bit length, the codec can perform a parallel prefix sum to obtain the starting position of each macroblock in the final output bit stream.

The codec then causes the GPU to write the encoded data onto an output stream to be buffered in main system memory, in one implementation, by writing the data of each macroblock in a raster-like order (322). In one implementation, the data can be written into CPU memory by the GPU using parallel processing operations. For example, the codec may cause the data to be written to an output stream in a gather operation. For example, a process or function tasked with writing a data word (such as 1 or 2 bytes) can use the starting bit positions for each macroblock and the position of the data word in the output stream for the frame to determine from which reserved memory locations to access the data bit to construct the data word and write it to memory. The gather operation allows for writing the output in a parallel processing operation utilizing the resources of the GPU thereby further increasing throughput. For example, in one implementation, a function can be defined that receives as inputs the position of the data or machine word in the memory to which the output stream is written. The function is operative to assemble the machine word from selected portions of the bits of one or more macroblocks based on the position of the data or machine word and the starting bit values of the macroblocks, and write the data of machine word to the memory. This function can be implemented in parallel to accelerate writing this output from a memory of a GPU to main memory for transmission over a network. In other implementations, the memory of the GPU can be directly accessed to write the data for transmission to a socket or other connection abstraction.

The codec then encodes all signals and choices for each macroblock sequentially using context based binary arithmetic coding. In one implementation, for each context, the current state is represented by a 256 state model, with a static state transition table representing the next state after either a 1 or a 0 is encoded from a given state. In one implementation, the codec translates the state into a probability with a static table. In another implementation, the codec translates the state into a probability with a dynamic table, adjusting the probability after each encoding event to better match the actual probability. In one implementation, the signals for macroblocks that are encoded may include subblock choice (e.g., 16×16, 8×16, 16×8 or 8×8, including sub-subblock choice and transform type (8×8, 4×4, DIT A, DIT B, DIT C, DIT D, DIT E, DIT F)); DC only flags (if true, then the macroblock has no AC coefficients); and plane encoding (if true, then the macroblock uses a plane encoding).

P Frame Encoding

The process illustrated in FIG. 3 can be used to naively encode each individual video frame at some desired frame rate. In some implementations, the process illustrated in FIG. 3 can be used in predictive coding schemes to encode so-called I frames, while other processes that may involve the FITs and DITs described above can be used to encode so-called P (predictive) frames.

Decoding the Video Stream

Figure 5:
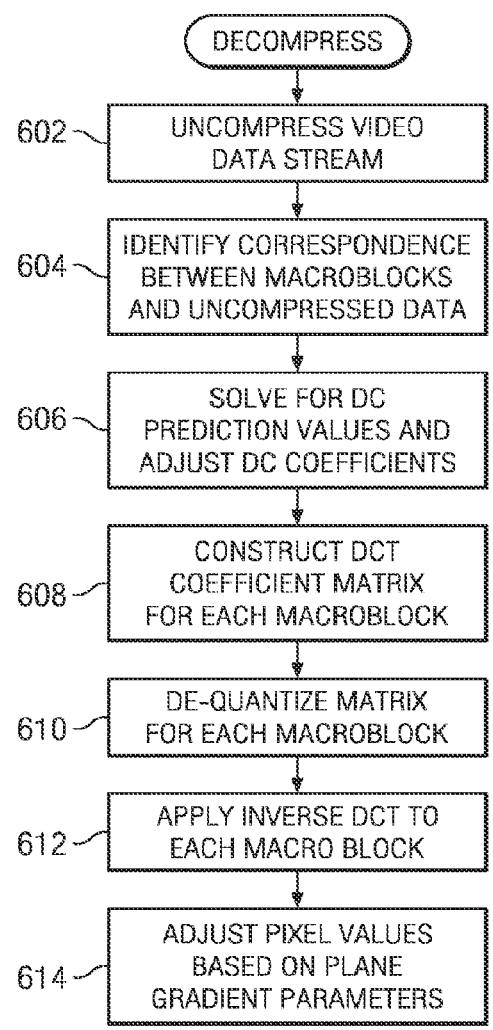
FIG. 5 is a flow chart showing an example method directed to decoding compressed data.

Decoding the compressed video data essentially involves the inverse of the operations discussed above. FIG. 5 illustrates an example decoding process according to one implementation of the present invention. In one implementation, the video decoder accesses the encoded data and decompresses the video data stream (602). The decoder decodes the arithmetically encoded data sequentially, finding the choices and signals that the encoder encoded for each macroblock. In implementations, where RLE and Huffman coding is used, the decoder decompresses the data stream using known algorithms. The decoder then identifies the correspondence between macroblocks of a frame in the uncompressed video data (604). In one implementation, the video data also includes a table that identifies the starting bit positions for each macroblock. In another implementation the video data also includes a table that identifies starting bit positions for slices (horizontal slices of the video frame one or more macroblocks high). In some implementations involving P frames, the decoder can identify a mode (I or P) for each macroblock from the previously arithmetic decoded data.

For I mode macroblocks, if signaled by the encoder, the decoder solves for the DC prediction values and adjusts the DC coefficients based on the determined DC prediction values (606). In one implementation, the decoder processes the macroblocks in a raster-like order. Accordingly, the DC prediction values can be computed by accessing the neighboring macroblocks, the DC coefficients of which have already been computed. In some implementations, the DC prediction values can be solved in parallel processing operations by performing the 2D equivalent of a prefix sum.

As FIG. 5 illustrates, the decoder constructs a transform coefficient matrix for each partition of each macroblock (608) based on the inverse of the re-ordering process described above. The decoder then de-quantizes the matrix for each partition of the macroblocks (610) and applies an inverse transform operation to the matrices (612). For I-mode macroblocks where signaled by the encoder, the decoder also adjusts the pixel values based on the plane gradient parameters (614). For P-mode macroblocks, the decoder could adjust the pixel values based on the motion estimation parameters. Although not illustrated in FIG. 5, the decoder may also upsample the chroma components of the video data and remap the data from the YCbCr color model to the RGB color model. The resulting data can be written to on-screen memory for display by a display device.

The decoder operations described above can be implemented on a general purpose computer or a mobile device using the resources of the central processing unit. In other implementations, the resources of a GPU can be used to facilitate some or all of the decoding operations discussed above. Furthermore, many of the operations can be done in parallel or in serial. For example, the processing at the macroblock level can be processed in parallel.

D. Example Operating Environment and System Architectures

D.1. Network Environment

FIG. 1 illustrates an example network environment in which particular implementations of the invention may operate. As FIG. 1 illustrates, particular implementations of the invention may operate in a network environment comprising a video transmission system 20 that is operatively coupled to a network cloud 60, which may include the Internet. Network cloud 60 generally represents one or more interconnected networks, over which the systems and hosts described herein can communicate. Network cloud 60 may include packet-based wide area networks (such as the Internet), private networks, wireless networks, satellite networks, cellular networks, paging networks, and the like. Some of the networks in network cloud 60 may be circuit-switched networks. The computer network environment, including network 60 can be a packet-based communications environment, employing TCP/IP protocols (for example), and/or other suitable protocols, and has a plurality of interconnected digital packet transmission stations or routing nodes. Client nodes 82 and 84 are operably connected to the network environment via a network service provider or any other suitable means. Client nodes 82 and 84 may include personal computers or cell phones, as well as other types of mobile devices such as lap top computers, personal digital assistants (PDAs), etc.

Video transmission system 20 is a network addressable system that hosts one or more applications that stream video data to one or more users over a computer network. The video transmission system 20 may include web site and server functionality where users may request and receive identified web pages, video and other content over the computer network. The video data may incorporate non-interactive multimedia content, such a movies, animation, television programming, live broadcasts and the like, or may be video data rendered in connection with interactive games or other network-based applications in a server-side rendering system.

In particular implementations, video transmission system 20 comprises one or more physical servers 22 and one or more data stores 24. The one or more physical servers 22 are operably connected to computer network 60 via a router 26. The one or more physical servers 22, in one particular implementation, host functionality that allows users to browse available content, such as receiving requests from, and transmitting responsive data to, client nodes 82 and 84. In one implementation, the functionality hosted by the one or more physical servers may include web or HyperText Transport Protocol (HTTP) servers, Real Time Streaming Protocol (RTSP) servers, and the like.

Physical servers 22, as discussed above, host functionality directed to supporting and implementing video transmission system 20. In a particular implementation, the physical servers 22 may host one or more instances of a video streaming (e.g., RTSP) server and one or more instances of a remote rendering device server. In one implementation, a data store 24 may store video content such as digital content data objects, user information, and other media assets. A content data object or a content object, in particular implementations, is an individual item of digital information typically stored or embodied in a data file, binary large object (BLOB) or record. Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects, object or asset definitions, and the like. Structurally, content data store 24 connotes a large class of data storage and management systems. In particular implementations, content data store 24 may be implemented by any suitable physical system including components, such as database servers, mass storage media, media library systems, and the like. This data may be accessed to render video frames in substantial real-time for transmission to one or more client nodes 82, 84. The video codec described above can be used by servers 22 to compress the video data stream for transmission over network cloud 60, while client nodes 82, 84 can receive the encoded data and decompress it.

D.2. Example Computing System Architecture

The server and client host systems described herein may be implemented in a wide array of computing systems and architectures. The following describes example computing architectures for didactic, rather than limiting, purposes.

Figure 2:
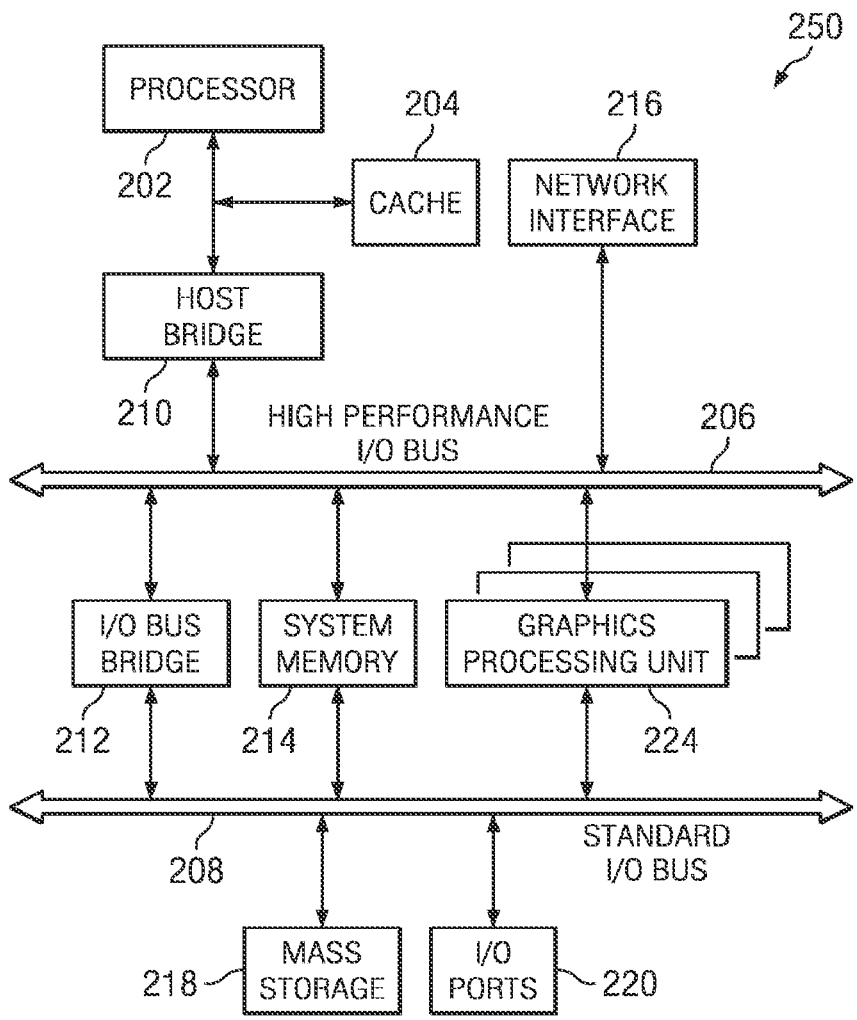
FIG. 2 is an example computing system architecture according to one possible implementation of the invention.

FIG. 2 illustrates an example computing system architecture, which may be used to implement a physical server and, in some instances, a client host. In one embodiment, hardware system 200 comprises a processor 202, a cache memory 204, and one or more software applications and drivers directed to the functions described herein. Additionally, hardware system 200 includes a high performance input/output (I/O) bus 206 and a standard I/O bus 208. A host bridge 210 couples processor 202 to high performance I/O bus 206, whereas I/O bus bridge 212 couples the two buses 206 and 208 to each other. A system memory 214 and a network/communication interface 216 couple to bus 206. For physical servers and clients hosting video compression functionality, hardware system 200 may further include one or more graphics processing units 224 coupled to buses 206 and 208. In one implementation, the graphics processing unit 224 may be embodied in a graphics or display card that attaches to the hardware system architecture via a card slot. In other implementations, the graphics processor unit 224 may be integrated on the motherboard of the server system architecture. Suitable graphics processing units include Advanced Micro Devices(r)AMD R7XX based GPU devices (Radeon(r) HD 4XXX), AMD R8XX based GPU devices (Radeon(r) HD 5XXX), Intel(r) Larabee based GPU devices (yet to be released), nVidia(r) 8 series GPUs, nVidia(r) 9 series GPUs, nVidia(r) 100 series CPUs, nVidia(r) 200 series GPUs, and any other DX11-capable GPUs.

Mass storage 218, and I/O ports 220 couple to bus 208. Hardware system 200 may optionally include a keyboard and pointing device, and a display device (not shown) coupled to bus 208, Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 200 are described in greater detail below. In particular, network interface 216 provides communication between hardware system 200 and any of a wide range of networks, such as an Ethernet (e.g., IEEE 802.3) network, etc. Mass storage 218 provides permanent storage for the data and programming instructions to perform the above described functions implemented in the location server 22, whereas system memory 214 (e.g., DRAM) provides temporary storage for the data and programming instructions when executed by processor 202. I/O ports 220 are one or more serial and/or parallel communication ports that provide communication between additional peripheral devices, which may be coupled to hardware system 200.

Hardware system 200 may include a variety of system architectures; and various components of hardware system 200 may be rearranged. For example, cache 204 may be on-chip with processor 202. Alternatively, cache 204 and processor 202 may be packed together as a "processor module," with processor 202 being referred to as the "processor core." Furthermore, certain embodiments of the present invention may not require nor include all of the above components. For example, the peripheral devices shown coupled to standard I/O bus 208 may couple to high performance I/O bus 206. In addition, in some embodiments, only a single bus may exist, with the components of hardware system 200 being coupled to the single bus. Furthermore, hardware system 200 may include additional components, such as additional processors, storage devices, or memories.

Graphics processing unit 224, in one implementation, comprises one or more integrated circuits and/or processing cores that are directed to mathematical operations commonly used in graphics rendering. In some implementations, the GPU 224 may use a special graphics unit instruction set, while in other implementations, the GPU may use a CPU-like (e.g. a modified x86) instruction set. Graphics processing unit 224 can implement a number of graphics primitive operations, such as butting, texture mapping, pixel shading, frame buffering, and the like. In addition to the 3D hardware, graphics processing unit 224 may include basic 2D acceleration and framebuffer capabilities. In addition, graphics processing unit 224 may support the YUV color space and hardware overlays, as well as MPEG primitives (such as motion compensation and iDCT). Graphics processing unit 224 may be a graphics accelerator, a GPGPU (General Purpose GPU), or any other suitable processing unit.

As discussed below, in one implementation, the operations of one or more of the physical servers described herein are implemented as a series of software routines run by hardware system 200. These software routines comprise a plurality or series of instructions to be executed by a processor in a hardware system, such as processor 202. Initially, the series of instructions may be stored on a storage device or other computer readable medium, such as mass storage 218. However, the series of instructions can be stored on any suitable storage medium, such as a diskette, CD-ROM, ROM, EEPROM, etc. Furthermore, the series of instructions need not be stored locally, and could be received from a remote storage device, such as a server on a network, via network/communication interface 216. The instructions are copied from the storage device, such as mass storage 218, into memory 214 and then accessed and executed by processor 202. The software routines can cause certain operations to be performed by the graphics processing unit 224 and/or the processor 202.

An operating system manages and controls the operation of hardware system 200, including the input and output of data to and from software applications (not shown). The operating system provides an interface between the software applications being executed on the system and the hardware components of the system. According to one embodiment of the present invention, the operating system is the Windows@ 95/98/NT/XP/Vista/7 operating system, available from Microsoft Corporation of Redmond, Wash. However, the present invention may be used with other suitable operating systems, such as the Apple Macintosh Operating System, available from Apple Computer Inc. of Cupertino, Calif., UNIX operating systems, LINUX operating systems, and the like. Of course, other implementations are possible. For example, the server functionalities described herein may be implemented by a plurality of server blades communicating over a backplane.

Additionally, video decoding clients may be hosted on the same or similar hardware architectures. For example, client computer 82 may include a GPU which loads encoded video into GPU memory, and decodes the encoded video data to render one or more frames of a video sequence. In other implementations, some or all of the video compression and de-compression operations may also be performed in system memory using a general purpose computing architecture as well.

The example video codec described herein processes video frames buffered in a memory. The memory may be main CPU memory or, in some implementations, the memory buffers available on a GPU. For example, a separate rendering process executing on a GPU (or a CPU) may render a video frame. The example codec may process the frame as described above for output to a video client for decoding and display.

Lastly, the above-described elements and operations can be comprised of instructions that are stored on storage media. The instructions can be retrieved and executed by a processing system. Some examples of instructions are software, program code, and firmware. Some examples of storage media are memory devices, tape, disks, integrated circuits, and servers. The instructions are operational when executed by a processing system to direct the processing system to operate in accord with the invention. The term "processing system" refers to a single processing device or a group of inter-operational processing devices. Some examples of processing devices are integrated circuits and logic circuitry. Those skilled in the art are familiar with instructions, computers, and storage media.

The present invention has been explained with reference to specific embodiments. For example, although the embodiments described above operate in connection with a client-server model, the video codec described above can also operate in peer-to-peer architectures as well, such as in connection with Video over IP or teleconferencing systems. Still further, the codec described above can be used to encode video data for storage on a data storage medium, such as a magnetic or optical disk. In addition, the inventions described herein can be used to encode single images as opposed to a sequence of video frames. Other embodiments will be evident to those of ordinary skill in the art. It is therefore not intended that the present invention be limited, except as indicated by the appended claims.

What is claimed is:

1. A method, comprising
accessing a set of N input values stored in a memory; and
computing a set of N Discrete Cosine Transform (DCT) coefficients, including a DC coefficient, from the N input values by applying an ordered set of operations, the ordered set of operations comprising lifted butterfly operations;
wherein the lifted butterfly operations results in, for any given input value pair comprising a first input value and a second input value, an output value pair comprising the average of the first and second input values and half the difference between the first and second input value, and
wherein during the computing, a DC basis function is maintained to be flat by applying a set of the lifted butterfly operations initially on the N inputs values and then recursively on low pass outputs of a previous stage, and by arranging the ordered set of operations such that the DC coefficient of the DCT coefficients is substantially equal to the average value of the N inputs values.

2. The method of claim 1 wherein the ordered set of operations further comprise a shifted add operation.

3. The method of claim 1 wherein the ordered set of operations further comprise a shifted subtract operation.

4. The method of claim 1 wherein the ordered set of operations is configured based on application of a genetic optimization algorithm.

5. A method comprising
accessing a two-dimensional block of video frame information stored in a memory;
applying, in a first transform pass, a set of 1-dimensional transforms to the pixel values of the two-dimensional block along a first diagonal direction to compute a resulting set of DCT coefficients;
grouping the set of DCT coefficients resulting from the first transform pass into two or more diagonal partitions that are separated along diagonal directions of the block;
applying, in a second transform pass and relative to each diagonal partition, 1-dimensional transforms to respective sets of same order coefficients in the set of DCT coefficients resulting from the first transform pass and grouped in the two or more diagonal partitions; and
applying a 1-dimensional transform having a length corresponding to the number of diagonal partitions to the DC coefficients of the two or more diagonal partitions to compute a single DC coefficient.

6. The method of claim 5 wherein applying the 1-dimensional transforms comprises:
accessing a set of N input values of the block stored in the memory; and
computing a set of N Discrete Cosine Transform (DCT) coefficients, including a DC coefficient, from the N input values by applying an ordered set of operations, the ordered set of operations comprising lifted butterfly operations;
wherein the lifted butterfly operations results in, for any given input value pair comprising a first input value and a second input value, an output value pair comprising the average of the first and second input values and half the difference between the first and second input value, and
wherein during the computing, a DC basis function is maintained to be flat by applying a set of the lifted butterfly operations initially on the N inputs values and then recursively on low pass outputs of a previous stage, and by arranging the ordered set of operations such that the DC coefficient of the DCT coefficients is substantially equal to the average value of the N inputs values.

7. The method of claim 5 further comprising scaling the DCT coefficients resulting from the first transform pass.

8. The method of claim 5 further comprising applying one or more permutation vectors to locate the same order coefficients in the set of DCT coefficients resulting from the first transform pass.

* * * * *